US010997987B2

(12) United States Patent
Spriet et al.

(10) Patent No.: US 10,997,987 B2
(45) Date of Patent: May 4, 2021

(54) SIGNAL PROCESSOR FOR SPEECH ENHANCEMENT AND RECOGNITION BY USING TWO OUTPUT TERMINALS DESIGNATED FOR NOISE REDUCTION

(71) Applicant: NXP B.V., Eindhoven (NL)

(72) Inventors: Ann Elvire F. Spriet, Bertem (BE); Wouter Joos Tirry, Wijgmaal (BE)

(73) Assignee: NXP B.V., Eindhoven (NL)

( * ) Notice: Subject to any disclaimer, the term of this patent is extended or adjusted under 35 U.S.C. 154(b) by 142 days.

(21) Appl. No.: 15/980,153

(22) Filed: May 15, 2018

(65) Prior Publication Data

US 2018/0366146 A1 Dec. 20, 2018

(30) Foreign Application Priority Data

Jun. 16, 2017 (EP) .................................... 17176486

(51) Int. Cl.
*H04R 1/40* (2006.01)
*B60R 11/02* (2006.01)
(Continued)

(52) U.S. Cl.
CPC .......... *G10L 25/84* (2013.01); *G10L 21/0216* (2013.01); *G10L 25/18* (2013.01);
(Continued)

(58) Field of Classification Search
CPC . H04R 1/406; B60R 11/0264; G10L 21/0364; G10L 21/0208; G06Q 20/108
(Continued)

(56) References Cited

U.S. PATENT DOCUMENTS 5,251,263 A * 10/1993 Andrea .............. G10K 11/1784 381/71.6
8,306,821 B2 * 11/2012 Nongpiur ............ G10L 21/0364 704/205
(Continued)

FOREIGN PATENT DOCUMENTS

AU 2017202000 A1 4/2017
EP 1 632 935 B1 1/2008
(Continued)

OTHER PUBLICATIONS

Nakanishi, Isao et al; "Speech Enhancement Based on Frequency Domain ALE with Adaptive De-Correlation Parameters"; International Journal of Computer Theory and Engineering, vol. 5, No. 2; pp. 292-297 (Apr. 2013).
(Continued)

*Primary Examiner* — Farzad Kazeminezhad

(57) ABSTRACT

A signal processor comprising: an input terminal, configured to receive an input-signal; a voicing-terminal, configured to receive a voicing-signal representative of a voiced speech component of the input-signal; an output terminal; a delay block, configured to receive the input-signal and provide a filter-input-signal as a delayed representation of the input-signal; a filter block, configured to: receive the filter-input-signal; and provide a noise-estimate-signal by filtering the filter-input-signal; a combiner block, configured to: receive a combiner-input-signal representative of the input-signal; receive the noise-estimate-signal; and combine the combiner-input-signal with the noise-estimate-signal to provide an output-signal to the output terminal; and a filter-control-block, configured to: receive the voicing-signal; receive signalling representative of the input-signal; and set filter coefficients of the filter block in accordance with the voicing-signal and the input-signal.

17 Claims, 4 Drawing Sheets

(51) Int. Cl.

| | |
|---|---|
| ***G10L 21/0364*** | (2013.01) |
| ***G06Q 20/10*** | (2012.01) |
| ***G10L 21/0208*** | (2013.01) |
| ***G10L 25/84*** | (2013.01) |
| ***G10L 21/0216*** | (2013.01) |
| ***G10L 25/18*** | (2013.01) |
| ***G10L 25/21*** | (2013.01) |
| ***G10L 25/24*** | (2013.01) |
| *G10L 25/93* | (2013.01) |
| *G10L 25/90* | (2013.01) |

(52) U.S. Cl.
CPC .............. *G10L 25/21* (2013.01); *G10L 25/24* (2013.01); *G10L 25/90* (2013.01); *G10L 25/93* (2013.01); *G10L 2021/02085* (2013.01); *G10L 2021/02163* (2013.01)

(58) Field of Classification Search
USPC ............................ 381/92; 704/205, 207, 226
See application file for complete search history.

(56) References Cited

U.S. PATENT DOCUMENTS

| | | | | |
|---|---|---|---|---|
| 2004/0234079 | A1 | 11/2004 | Schneider et al. | |
| 2005/0027520 | A1 | 2/2005 | Mattila et al. | |
| 2006/0095256 | A1* | 5/2006 | Nongpiur ............. | G06Q 20/108 704/207 |
| 2006/0239471 | A1* | 10/2006 | Mao ....................... | H04R 1/406 381/92 |
| 2008/0004868 | A1 | 1/2008 | Nongpiur et al. | |
| 2008/0159568 | A1 | 7/2008 | Asada et al. | |
| 2010/0027589 | A1 | 2/2010 | Bastug et al. | |
| 2011/0276324 | A1 | 11/2011 | Nongpiur et al. | |
| 2012/0010881 | A1* | 1/2012 | Avendano ........... | G10L 21/0208 704/226 |
| 2013/0191119 | A1 | 7/2013 | Sugiyama | |
| 2019/0126845 | A1* | 5/2019 | Tao ..................... | B60R 11/0264 |

FOREIGN PATENT DOCUMENTS

| | | | |
|---|---|---|---|
| EP | 3089483 | A1 | 11/2016 |
| WO | WO-2014145761 | A2 | 9/2014 |

OTHER PUBLICATIONS

Ephraim, Yariv et al;, "Speech Enhancement Using a Minimum Mean-Square Error Short-Time Spectral Amplitude Estimator," IEEE Transactions on Acoustics Speech and Signal Processing, vol. ASSP-32, No. 6; pp. 1109-1121 (Dec. 1984).
Taghia, Jalal et al; "A Frequency-Domain Adaptive Line Enhancer with Step-Size Control Based on Mutual Information for Harmonic Noise Reduction"; IEEE/ACM Trans. on Audio, Speech, and Languate Processing, vol. 24, No. 6; pp. 1140-1154 (Jun. 2016).
Sambur, M.; "Adaptive Noise Canceling for Speech Signals"; IEEE Transactions on Acoustics, Speech and Signal Processing, vol. 26, No. 5; pp. 419-423 (Oct. 1978).
Martin, Rainer, "Noise Power Spectral Density Estimation Based on Optimal Smoothing and Minimum Statistics," IEEE Transactions on Speech and Audio Processing, vol. 9, No. 5, pp. 504-505 (Jul. 2001).
Sasaoka, Nato et al; "Speech Enhancement Based on Adaptive Filter with Variable Step Size for widenband and Periodic Noise"; IEEE Int'l Midwest Symposium on Circuits and Systems, Mexico, Cancun; IEEE, Piscataway, NJ, USA; pp. 648-652 (2009).

* cited by examiner

SIGNAL PROCESSOR FOR SPEECH ENHANCEMENT AND RECOGNITION BY USING TWO OUTPUT TERMINALS DESIGNATED FOR NOISE REDUCTION

CROSS-REFERENCE TO RELATED APPLICATIONS

This application claims the priority under 35 U.S.C. § 119 of European patent application no. 17176486.3, filed Jun. 16, 2017 the contents of which are incorporated by reference herein.

The present disclosure relates to signal processors, and in particular, although not necessarily, to signal processors configured to process signals containing both speech and noise components.

According to a first aspect of the present disclosure there is provided a signal processor comprising:

- an input terminal, configured to receive an input-signal;
- a voicing-terminal, configured to receive a voicing-signal representative of a voiced speech component of the input-signal;
- an output terminal;
- a delay block, configured to receive the input-signal and provide a filter-input-signal as a delayed representation of the input-signal;
- a filter block, configured to:
  - receive the filter-input-signal; and
  - provide a noise-estimate-signal by filtering the filter-input-signal;
- a combiner block, configured to:
  - receive a combiner-input-signal representative of the input-signal;
  - receive the noise-estimate-signal; and
  - combine the combiner-input-signal with the noise-estimate-signal to provide an output-signal to the output terminal; and
- a filter-control-block, configured to:
  - receive the voicing-signal;
  - receive signalling representative of the input-signal; and
  - set filter coefficients of the filter block in accordance with the voicing-signal and the input-signal.

In one or more embodiments, the filter-control-block may be configured to: receive signalling representative of the output-signal and/or a delayed-input-signal; and set the filter coefficients of the filter block in accordance with the output-signal and/or the delayed-input-signal.

In one or more embodiments, the input-signal and the output-signal may be frequency domain signals relating to a discrete frequency bin. The filter coefficients may have complex values.

In one or more embodiments, the voicing-signal may be representative of one or more of: a fundamental frequency of the pitch of the voice-component of the input-signal; a harmonic frequency of the voice-component of the input-signal; and a probability of the input-signal comprising a voiced speech component and/or the strength of the voiced speech component.

In one or more embodiments, the filter-control-block may be configured to set the filter coefficients based on previous filter coefficients, a step-size parameter, the input-signal, and one or both of the output-signal and the delayed-earlier-input-signal.

In one or more embodiments, the filter-control-block may be configured to set the step-size parameter in accordance with one or more of: a fundamental frequency of the pitch of the voice-component of the input-signal; a harmonic frequency of the voice-component of the input-signal; an input-power representative of a power of the input-signal; an output-power representative of a power of the output signal; and a probability of the input-signal comprising a voiced speech component and/or the strength of the voiced speech component.

In one or more embodiments, the filter-control-block may be configured to: determine a leakage factor in accordance with the voicing-signal; and set the filter coefficients by multiplying filter coefficients by the leakage factor.

In one or more embodiments, the filter-control-block may be configured to set the leakage factor in accordance with a decreasing function of a probability of the input-signal comprising a voice signal.

In one or more embodiments, the filter-control-block may be configured to determine the probability based on: a distance between a pitch harmonic of the input-signal and a frequency of the input-signal; or a height of a Cepstral peak of the input-signal.

In one or more embodiments, a signal processor of the present disclosure may further comprise a mixing block configured to provide a mixed-output-signal based on a linear combination of the input-signal and the output signal.

In one or more embodiments, a signal processor of the present disclosure may further comprise: a noise-estimation-block, configured to provide a background-noise-estimate-signal based on the input-signal and the output signal; an a-priori signal to noise estimation block and/or an a-posteriori signal to noise estimation block, configured to provide an a-priori signal to noise estimation signal and/or an a-posteriori signal to noise estimation signal based on the input-signal, the output signal and the background-noise-estimate-signal; and a gain block, configured to provide an enhanced output signal based on: (i) the input-signal; and (ii) the a-priori signal to noise estimation signal and/or the a-posteriori signal to noise estimation signal.

In one or more embodiments, a signal processor of the present disclosure may be further configured to provide an additional-output-signal to an additional-output-terminal, wherein the additional-output-signal may be representative of the filter-coefficients and/or the noise-estimate-signal.

In one or more embodiments, the input-signal may be a time-domain-signal and the voicing-signal may be representative of one or more of: a probability of the input-signal comprising a voiced speech component; and the strength of the voiced speech component in the input-signal.

In one or more embodiments, there may be provided a system comprising a plurality of signal processors of the present disclosure, wherein each signal processor may be configured to receive an input-signal that is a frequency-domain-bin-signal, and each frequency-domain-bin-signal may relate to a different frequency bin.

In one or more embodiments, there may be provided a computer program, which when run on a computer, causes the computer to configure any signal processor of the present disclosure or the system.

In one or more embodiments, there may be provided an integrated circuit or an electronic device comprising any signal processor of the present disclosure or the system.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

BRIEF DESCRIPTION OF DRAWINGS

One or more embodiments will now be described by way of example only with reference to the accompanying drawings in which.

Background noise can severely degrade the quality and intelligibility of speech signals captured by a microphone. As a result, some speech processing applications (for example, voice calling, human-to-machine interaction, hearing aid processing) incorporate noise reduction processing to enhance the captured speech. Single-channel noise reduction approaches can modify the magnitude spectrum of a microphone signal by a real-valued gain function. For the design of the gain function, it is possible to rely on an estimate of the background noise statistics. A common assumption can be that the amplitude spectrum of the noise is stationary over time. As a result, single-channel noise reduction approaches can only suppress the more long-term stationary noise components. In addition, since single channel approaches only apply a real-valued gain function, phase information is not exploited.

Many daily-life noises contain deterministic, periodic noise components. Some examples are horn-type sounds in traffic noise, and dish clashing in cafeteria noise. These sounds may be insufficiently suppressed by single channel noise reduction schemes, especially when the noises are relatively short in duration (for example, less than a few seconds).

Figure 1A:
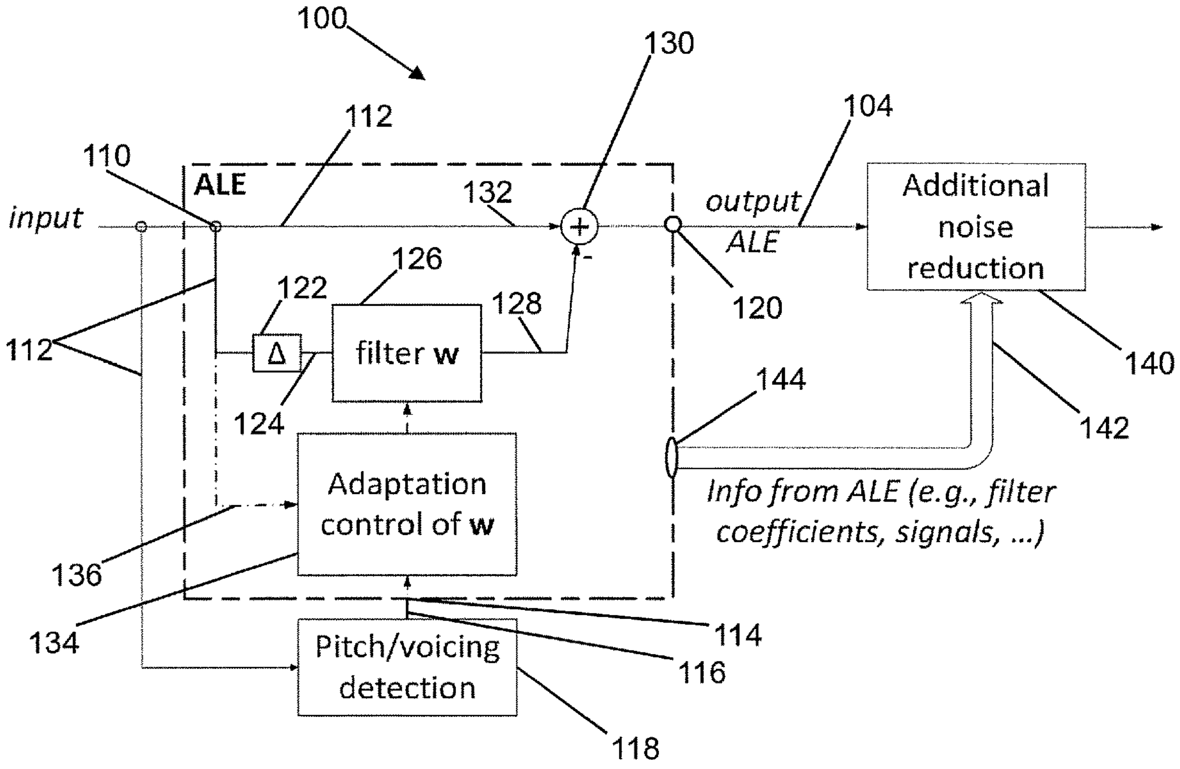
FIG. 1*a* shows an example embodiment of a signal processor with adaptive control of filter coefficients.

FIG. 1*a* shows a block diagram of a signal processor 100, which may be referred to as a voicing-driven adaptive line enhancer (ALE). An input-signal 112 is processed by the signal processor 100 to generate an output signal 104. A function of the signal processor 100 is to remove periodic noise components from the input signal 112 to provide the output signal 104 with noise components supressed, but without unhelpful suppression of speech components of the input signal 112. Advantageously, the signal processor 100 can use a voicing-signal 116, which is representative of a voice-component of the input-signal 112, to perform voicing-driven adaptive control. In some examples the voicing-signal 116 can be representative of a voiced speech component of the input-signal 112. In the following, the terms voice-component and voiced speech component can be considered synonymous.

Voicing-driven adaptation control can be applied in both time-domain and frequency-domain signal processors. For signal processing in the time domain, the voicing-signal 116 may be representative of a strength/amplitude of the pitch of a voice-component of the input-signal 112 (or a higher harmonic thereof), or the voicing-signal 116 may be representative of a probability or strength of voicing. Here the probability or strength of voicing refers to the probability that the input-signal 112 contains a voice or speech signal, or to the strength or amplitude of that voice or speech signal. This may simply be provided as a voicing-indicator that has a binary value to represent speech being present, or speech not being present. For signal processing in the frequency domain, the voicing-signal 116 may also be representative of the frequency of the pitch of a voice-component of the input-signal 112. In such examples, the pitch of the voice-component can be provided in a pitch-signal, which is an example of the voicing-signal 116. A pitch-driven frequency-domain signal processor may advantageously provide higher frequency selectivity than a time-domain processor and hence, increased ability to separate speech harmonics from noise. A frequency-domain signal processor may thereby provide an output signal with significantly reduced noise.

The input signal 112 and the output signal 104 can therefore be either time-domain signals (in case of a time-domain adaptive line enhancer) or frequency-domain signals, such as signals that represent one or more bins/bands in the frequency-domain (in case of a sub-band or frequency-domain line enhancer, that operates on each frequency bin/band needed to represent an audio signal).

The signal processor 100 has an input terminal 110, configured to receive the input-signal 112. The signal processor 100 has a voicing-terminal 114 configured to receive the voicing-signal 116. In this example, the voicing-signal 116 is provided by a pitch detection block 118 which is distinct from the signal processor 100, although in other examples the pitch detection block 118 can be integrated with the signal processor 100. The pitch detection block 118 is described in further detail below in relation to FIG. 2. The signal processor 100 also has an output terminal 120 for providing the output signal 104.

The signal processor 100 has a delay block 122 that can receive the input-signal 112 and provide a filter-input-signal 124 as a delayed representation of the input-signal 112. In some examples the delay block 122 can be implemented as a linear-phase filter. The signal processor 100 has a filter block 126, that can receive the filter-input-signal 124 and provide a noise-estimate-signal 128 by filtering the filter-input-signal 124. When the signal processor 100 is designed to process a frequency domain signal the filter coefficients can advantageously have complex values, such that both amplitudes and phases of the filter-input-signal 124 can be manipulated.

To avoid or reduce adaptation or suppression of speech harmonics in the input signal 112, the adaptation of the filter block 126 performed by the control block 134 is controlled by the pitch signal 116 (and optionally by voicing detection, as described further below). The voicing-driven control of the filter block 126 can slow down the adaptation provided by the signal processor 100 (for example, by steering the step-size, as discussed further below) on the speech harmonics of the input signal 112 and hence advantageously avoids, or at least reduces, speech attenuation.

The signal processor 100 has a combiner block 130, configured to receive a combiner-input-signal 132 representative of the input-signal 112. In this example the combiner-input-signal 132 is the same as the input-signal 112, although it will be appreciated that in other examples additional signal processing steps may be performed to provide the combiner-input-signal 132 from the input-signal 112. The combiner block 130 is also configured to receive the noise-estimate-signal 128, and to combine the combiner-input-signal 132 with the noise-estimate-signal 128 to provide the output-signal 104 to the output terminal 120. In this example, the output signal 104 is then provided to an optional additional noise reduction block 140 (which can provide additional noise reduction, such as, for example, spectral noise reduction).

In this example, the combiner block 130 is configured to subtract the filtered version of a delayed input signal, that is the noise-estimate-signal 128, from the combiner-input-signal 132 (which represents the input-signal 112) and can thereby remove the parts of the input-signal 112 that are correlated with the delayed version.

The signal processor 100 has a filter-control-block 134, that receives: (i) the voicing-signal 116; and (ii) signalling 136 representative of the input-signal 112. The signalling 136 representative of the input-signal 112 may be the input-signal 112. Alternatively, some additional signal processing may be performed on the input-signal 112 to provide the representation signal 136. The filter-control-block 134 can set filter coefficients for the filter block 126 in accordance with the voicing-signal 116 and the input-signal 112, as will be discussed in more detail below.

In this example, the signal processor 100 can provide an additional-output-signal 142 to an additional-output-terminal 144, which in turn is provided to the additional noise reduction block 140. In this way, the additional noise reduction block 140 can use the filter-coefficients and/or the noise-estimate-signal 128, either or both of which may be represented by the additional-output-signal 142. This may enable improvements in the functionality of the additional noise reduction block 140, to allow for more effective noise suppression.

More generally, signal processors (not shown) of the present disclosure can have an additional-output-terminal configured to provide any signal generated by a filter-block or a filter-control-block as an additional-output-signal, which may advantageously be used by any additional noise reduction block to improve noise reduction performance.

FIG. **1*b* shows a block diagram of a signal processor 100 similar to the signal processor of FIG. 1*a* but with some additional features and functionality. Feature of the signal processor 100 that are similar to those shown in FIG. 1*a*** have been given the same reference numerals, and may not necessarily be discussed further here.

The signal processor 100 has a filter-control-block 134 that is configured to receive signalling 138 representative of the output-signal 104 and signalling 125 representative of the filter-input-signal 124. In some examples, the signalling 138 representative of the output-signal 104 may be the output-signal 104, and similarly the signalling 125 representative of the filter-input-signal 124 may be the filter-input-signal. Alternatively, some additional signal processing may be performed on the output-signal 104 or the filter-input-signal 124 to provide the representation signals 125, 138. The filter-control-block 134 can set filter coefficients for the filter block 126 in accordance with the output-signal 104 and/or the filter-input-signal 124, as will be discussed in more detail below.

It will be appreciated that in other examples (not shown) a filter-control-block may be configured to receive either signalling representative of the input-signal or signalling representative of the output-signal. The filter-input-signal is an example of a delayed-input-signal because it provides a delayed representation of the input-signal. In other examples, the filter-control-block may instead be configured to receive a delayed-input-signal that is a different delayed representation of the input-signal than the filter-input-signal, because, for example the delayed-input-signal has a different delay with respect to the input-signal than the filter-input-signal. The filter-control-block may set the filter coefficients based on the delayed-input-signal.

When the filter-control-block 134 is configured to receive both the input-signal and a delayed-input-signal 125 it can determine the filter coefficients using matrix-based processing, such as by using least-squares optimization, for example. In this case, the filter coefficients can be computed based on the input-signal 112 and the delayed-input-signal 125 and the output-signal 104 is not required. The filter weights can be computed using estimates for the auto-correlation matrix (of the delayed-input-signal 125) and a cross-correlation vector between the delayed-input-signal 125 and the input-signal 112. The voicing-signal 116 can be used by the filter-control-block 134 to control an update speed of the auto-correlation matrix and the cross-correlation vector.

Figure 2:
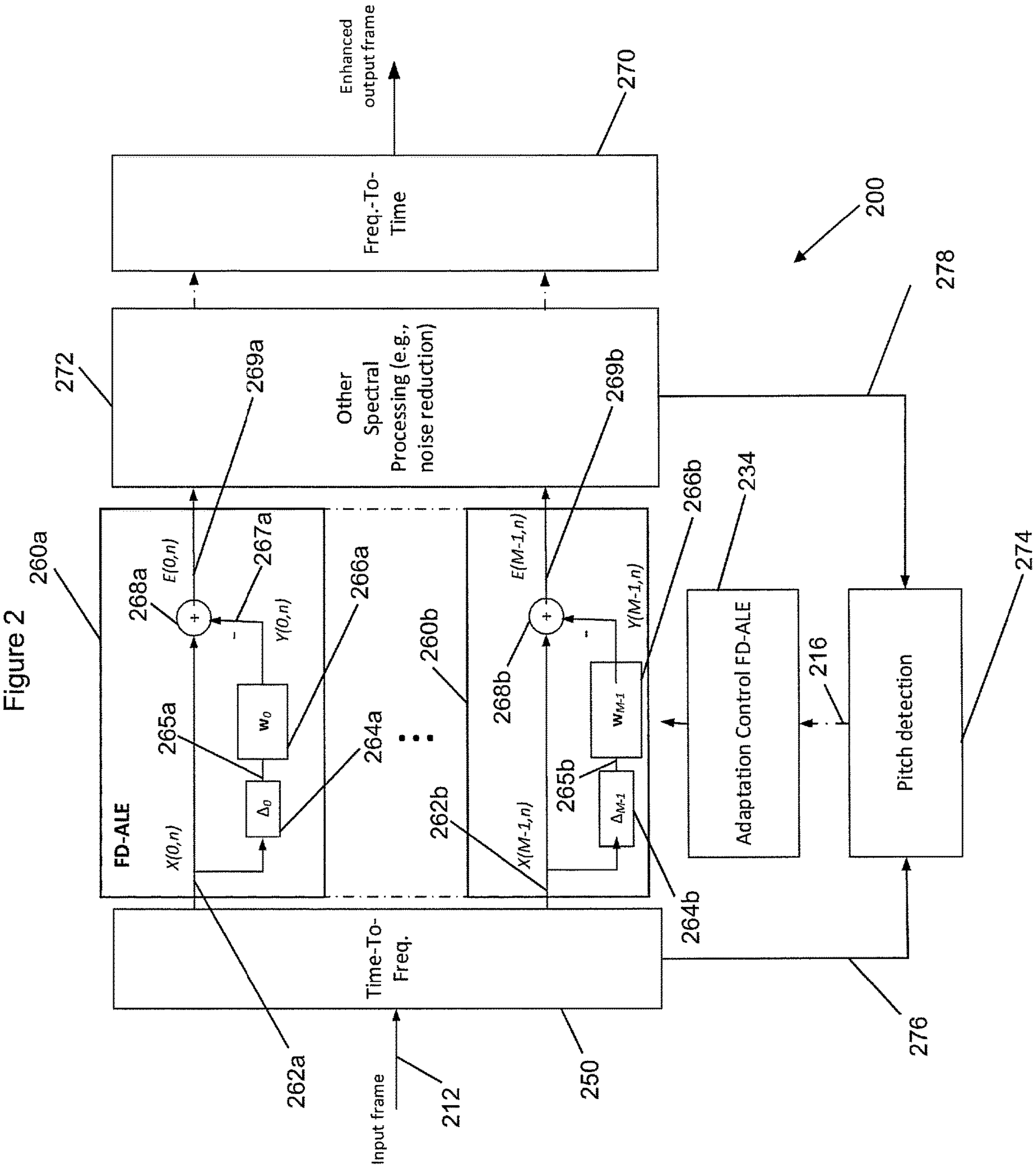
FIG. 2 shows an example embodiment of a system containing a plurality of signal processors similar to those of FIGS. 1*a* and 1*b*, each signal processor configured to process signals relating to different frequency bins.

FIG. 2 shows a system 200 that includes an implementation of a frequency-domain adaptive line enhancer with pitch-driven adaptation control, that uses a weighted overlap-add framework. It will be appreciated that other systems according to the present disclosure are not restricted to using an overlap-add framework; systems of the present disclosure can be used in combination with an overlap-save framework (for example, in an overlap-save based (partitioned-block) frequency domain implementation).

Each incoming input-signal 212 (which can have a frame index n to distinguish between different either earlier or later input-signals) is windowed and converted to the frequency domain by means of a time-to-frequency transformation (e.g., using an N-point Fast Fourier Transform [FFT]) by a FFT block 250. This results in a frequency-domain signal $X(k,n), k=0, \ldots, N-1$ where k denotes the frequency index and n denotes the frame index. Since the input signal is a real-valued signal, only $M=N/2+1$ frequency bins need to be processed (the other bins can be found as the complex conjugate of bin 1 to bin $N/2-1$). Each frequency-domain signal $X(k,n)$ that needs to be processed, is processed by a different signal processor 260. In FIG. 2 only two signal processors, a first signal processor **260*a* and a second signal processor 260*b* are shown, but it will be appreciated that systems of the present disclosure may have a plurality of signal processors of any number. Features of the second signal processor 260*b* have been given similar reference numerals to corresponding features of the first signal processor 260*a*** and may not necessarily be described further here.

The frequency-domain signal $X(k,n)$ for every frequency component k is delayed ($\Delta_k$) before being filtered by a filter $w_k$ consisting of $L_k$ filter taps. Thus, a first input-signal **262*a*, which is a first frequency domain signal relating to a first discrete frequency bin, is provided to a first delay block 264*a*, which in turn provides a first filter-input-signal 265*a* to a first filter block 266*a*. Since the filters used in the system 200 are complex-valued, both amplitude and phase information are used to reduce periodic noise components. The delay $\Delta_k$ can be referred to as a decorrelation parameter, which provides for a trade-off between speech preservation and structured noise suppression. The delay $\Delta_k$ does not necessarily need to be the same for all frequency bins. The larger the delay, the less a signal processor 260** will adapt to the short-term correlation of the speech, but the structured noise may also be less suppressed.

Figure 1B:
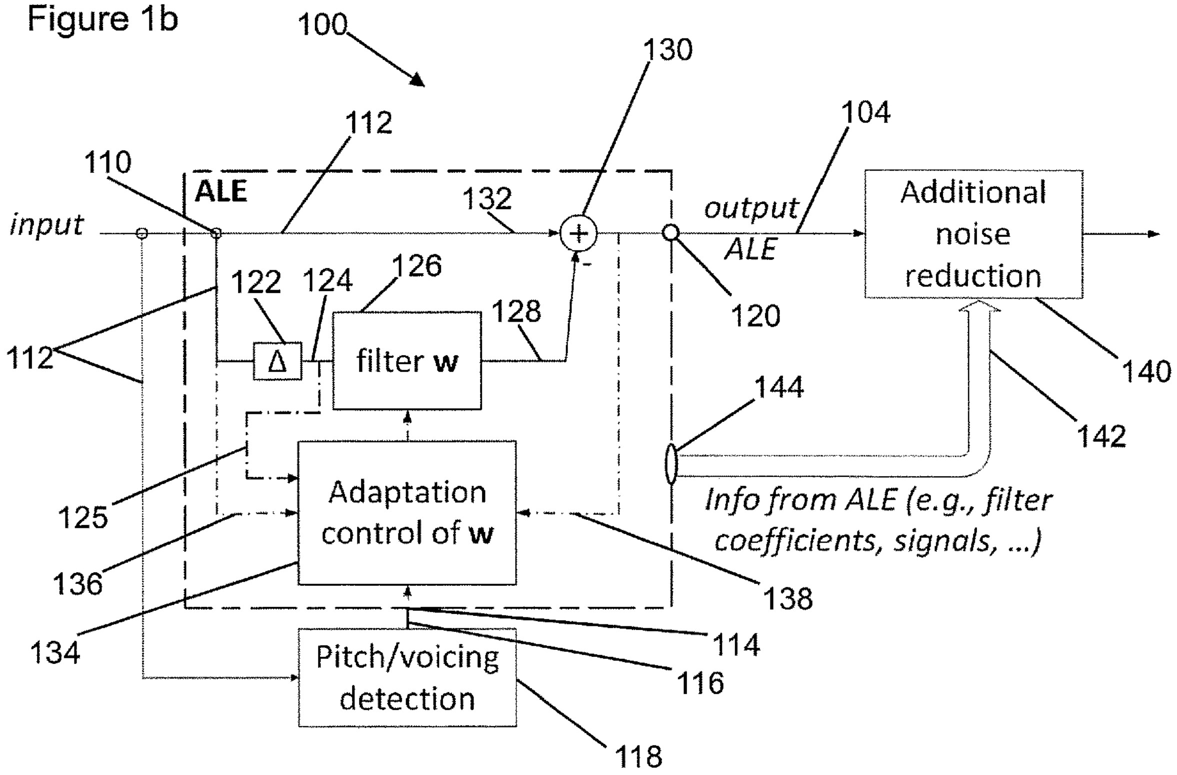
FIG. 1*b* shows an example embodiment of a signal processor similar to that of FIG. 1*a* but with additional features.

Each filter block 266*a*, 266*b* provides the noise-estimate-signal, denoted Y(k, n), which comprises an estimate of the periodic noise component in the input-signal in the k-th frequency bin. A filter-control-block 234 sets the filter coefficients for each filter block 266*a*, 266*b* as described above in relation to FIGS. 1*a* and 1*b*. Advantageously, the filter-control-block 234 can set different filter coefficients for each filter block 266*a*, 266*b*, based on a pitch-signal 216 received from the pitch detection block 274. Thereby, each signal processor 260*a*, 260*b* can be configured to use filter coefficients that are appropriately set for the particular input-signals 262*a*, 262*b* being processed.

The pitch detection block 274 receives: (i) time-to-frequency signalling 276 representative of the input signal 212 from the time-to-frequency block 250; and (ii) spectral signalling 278 that is representative of the output signals 269*a*, 269*b* from the additional spectral processing block 272. In other examples (not shown) the pitch detection block 274 may receive the input-signal 212 and the output signals 269*a*, 269*b* and detect the pitch by processing in the time-domain. The pitch frequency can be estimated by any means known to persons skilled in the art, such as in the cepstral domain, as discussed further below.

Each signal processor 206*a*, 260*b* includes a combiner 268*a*, 268*b* for subtracting the estimated periodic noise components Y(k,n) from the input-signals 262*a*, 262*b* to provide an enhanced frequency spectrum E(k,n), k=0, . . . , M−1, which are examples of output signals 269*a*, 269*b*. A frequency to time block 270 converts the enhanced frequency components E(k,n), k=0, . . . , M−1 back to the time-domain (through overlap-add or overlap-save, for example). The time-to-frequency conversion and/or frequency-to-time conversion, performed by the time-to-frequency block 250 and the frequency-to-time block 270 respectively, could be shared with any other spectral processing algorithm (e.g., state-of-the-art single channel noise reduction).

In this example, an optional additional spectral processing block 272 is provided between each signal processor 260*a*, 260*b* and the frequency to time block 270 to provide additional processing of the output signals 269*a*, 269*b* before the frequency to time conversion is performed.

Several different optimization criteria (e.g., Minimum Mean Squared Error) and resulting update equations (e.g., Least squares based approaches, Normalised Least Mean Squares [NLMS] based approaches, or Recursive Least Squares [RLS] based approaches) can be used by a filter-control-block 234 to update the filter coefficients for each frequency bin. The filter-control-block 234, which is similar to the filter-control-block described above in relation to FIG. 1*b*, receives both the input-signals 262*a*, 262*b* and the output signals 269*a*, 269*b* in order to compute the filter coefficients for the filter blocks 266*a*, 266*b*. The provision of the input-signals 262*a*, 262*b* and the output signals 269*a*, 269*b* to the filter-control-block 234 is not shown in FIG. 2 to aid clarity.

Presented below are example equations for updating filter coefficients for an NLMS based adaptation, minimizing the mean squared error.

For each input-signal 262*a*, 262*b*, the filter coefficients can be updated by a filter control-block 234 using the following update recursion, incorporating a frequency-dependent step-size parameter μ(k, n):

$$w_k(n+1)=w_k(n)+\mu(k,n)E^*(k,n)x_k(n)$$

$$w_k(n+1)=(1-\lambda(k,n))w_k(n+1).$$

In these equations the following definitions are used:

$$x_k(n)=[X(k,n-\Delta_k), \ldots ,X(k,n-\Delta_k-L_k+1]]^T,$$

$$w_k(n)=[W(k,n), \ldots W(k,n-L_k+1)]^T,$$

$$E(k,n)=X(k,n)-w_k^H(n)x_k(n).$$

To avoid large filter coefficients and hence, limit the impact of the signal processors 260*a*, 260*b* on the output signals 269*a*, 269*b* E(k,n), a leakage factor $0<\lambda(k,n)<1$ is used in this example to implement a so-called leaky NLMS approach.

In some NLMS based adaptations, the step-size μ(k,n) can depend on one or both of the powers $P_X(k,n)$ and $P_E(k,n)$ of the input signal $x_k$ (n) 262 and the error signal E(k, n) 269, respectively. In some examples, it is also possible to adapt the step-size μ(k,n) based on an estimate $k_{pitch}$ of the pitch frequency bin, which can be computed by the pitch detection block 274, as discussed above.

An advantage of adapting the step-size in this way is that is can be possible to slow down adaptation of filter coefficients at frequencies corresponding to speech harmonics, and thereby avoid a disadvantageous attenuation of the desired speech components of the input signal. An example step-size computation that can achieve this is shown below:

$$\mu(k, n) = (1 - Prob(\text{bin}(k, n) = \text{speech harmonic}))\frac{\mu_c(k)}{P_X(k, n) + \alpha(k)P_E(k, n) + \delta}.$$

Here, δ is a small constant to avoid division by zero, α(k) controls the contribution of the error power $P_E(k,n)$ to the step-size and $\mu_c(k)$ is a constant (i.e, independent of the frame size n) step-size factor chosen for processing the k-th frequency bin.

The higher the probability Prob(bin (k,n)=speech harmonic) that the k-th bin contains speech signalling, the more the adaptation of the filter coefficients is reduced on the k-th bin.

In addition to or instead of a pitch-driven step-size, a pitch-driven leakage mechanism can be used to reduce the filter coefficients towards zero for processing the speech harmonics, for example:

$$w_k(n+1)=(1-\lambda(k,n,k_{pitch}))w_k(n+1),$$

where a higher leakage factor A can be used on the speech harmonics.

The probability that the time-frequency bin (k,n) contains a speech harmonic, can be derived based on an estimate of the pitch frequency $k_{pitch}$, as determined by the pitch detection block 274. An example of an estimation method that can be performed by the pitch detection block 274 is to determine the pitch frequency by computing the index $q_{pitch}(n)$ of the cepstral peak of the input signal within the possible pitch range for speech (such as between approximately 50 Hz and 500 Hz) in the cepstral domain:

$$k_{pitch}(n) = \frac{N}{q_{pitch}(n)},$$

where N is the FFT-size of the time-to-frequency decomposition. Instead of deriving the pitch estimate based on the input signal, the pitch estimate can also be derived from a pre-enhanced input spectrum (for example, after applying state-of-the-art single channel noise reduction to the original audio input signal).

An estimate of Prob(bin (k,n)=speech harmonic) can, for example, be found using the following expression:

$$Prob(\text{bin}(k, n) = \text{speech harmonic}) \approx Prob(\text{frame } n = \text{voiced}) \cdot f\left(\min_{i=1, \ldots, P_n} dist(k, i * k_{pitch}(n))\right).$$

Here, Prob(frame n=voiced) measures the probability that the n-th frame is a voiced speech frame and $$\min_{i=1, \ldots, P_n}$$

distance (k,i*$k_{pitch}$(n)) measures the distance of the k-th frequency bin to the closest pitch harmonic. $P_n$ equals the number of pitch harmonics in the current frame. The mapping function ƒ maps the distance to a probability: the larger the distance of the k-th frequency bin to the closest pitch harmonic, the lower the probability that a pitch harmonic is present in the k-th frequency bin. An example of a possible binary mapping is shown below:

$$f\left(\min_{i=1, \ldots, P_n} dist(k, i * k_{pitch}(n))\right) = \begin{cases} 1 & \text{if } k \in [i * k_{pitch}(n) - \text{offset}(k),\ i * k_{pitch}(n) + \text{offset}(k)] \\ 0 & \text{if } k \notin [i * k_{pitch}(n) - \text{offset}(k),\ i * k_{pitch}(n) + \text{offset}(k)] \end{cases}$$

where the (optionally frequency-dependent) offset, offset(k), accounts for small deviations between the actual and estimated speech harmonic frequency. In this way, the function is equal to 1 if k is not either greater than i*$k_{pitch}$ or less than i*$k_{pitch}$ by more than the offset value, and otherwise the function is equal to zero.

In an optional example, the probability Prob(bin (k,n) =speech harmonic) can be refined by incorporating the probability Prob(frame n=voiced) of the current frame being voiced, thereby incorporating information from other frequency bins into the calculation of the probability for the k-th frequency bin.

The voicing probability can, for example, be derived from the height of the cepstral peak of the input-signal 262*a*, 262*b* in the cepstral domain. In some examples, all components of the input-signal 262*a*, 262*b* can be used to determine the voicing probability, that is, either a time-domain input signal, or all frequency bins of a frequency domain input signal can be used. The leakage factor λ(k, n) can be set in accordance with a decreasing function of probability of the input-signal 262*a*, 262*b* including a voice signal.

The above pitch-driven step-size control can reduce adaptation of speech harmonics whereas adaptation of the noise in-between the speech harmonics can still be achieved. As a result, there is advantageously a reduced need for a compromise between periodic noise suppression and harmonic speech preservation.

As discussed above in relation to FIGS. 1*a*, 1*b* and 2, the output signal from an adaptive line enhancer can be used as an improved input signal for a secondary, or additional, spectral noise suppression processor. In such cases, an improved spectral noise suppression method can be obtained by using information from the line enhancer, such as values of the filter coefficients or a periodic noise estimate.

Figure 3:
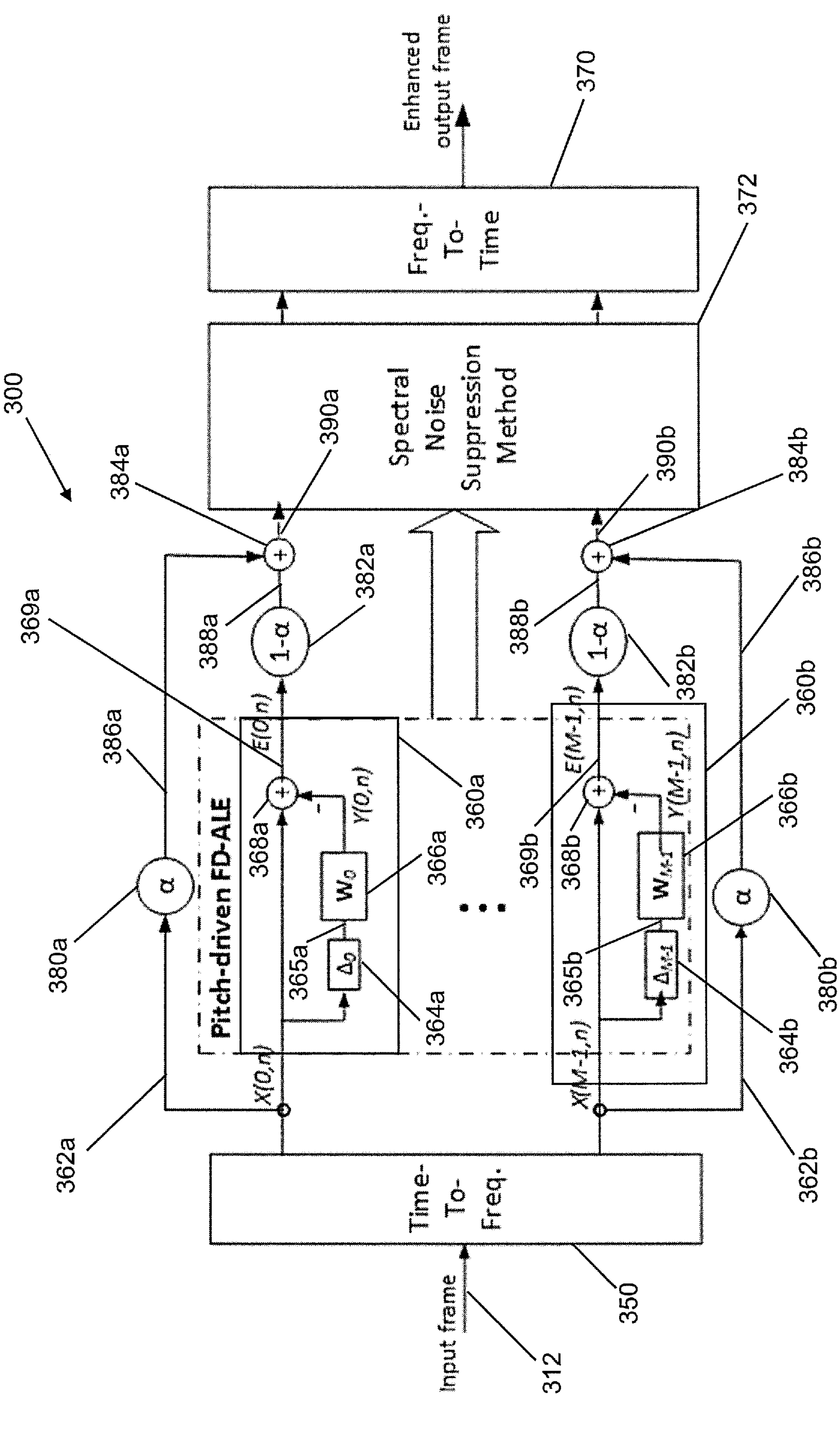
FIG. 3 shows an example embodiment of a system similar to that of FIG. 2, configured to provide a mixed output signal.

FIG. 3 shows a system 300 that is similar to the system of FIG. 2, in which similar features have been given similar reference numerals and may therefore not necessarily be discussed further below.

Each signal processor 360*a*, 360*b* is coupled to an input-multiplier 380*a*, 380*b*, and an output-multiplier 382*a*, 382*b* and a mixing block 384*a*, 384*b*. The input-multiplier 380*a*, 380*b* multiplies the input-signal 362*a*, 362*b* by a multiplication factor, α, to generate multiplied-input-signalling 386*a*, 386*b*. The output-multiplier 382*a*, 382*b* multiplies the output signal 269*a*, 269*b* by a multiplication factor, 1−α, to generate multiplied-output-signalling 388*a*, 388*b*. Each mixing block 384*a*, 384*b* receives the multiplied-input-signalling 386*a*, 386*b* (representative of the input-signals 362*a*, 362*b*) from the respective input-multiplier 380*a*, 380*b*. Each mixing block 384*a*, 384*b* also receives the multiplied-output-signalling 388*a*, 388*b* (representative of the output signals 369*a*, 369*b*) from the respective output-multiplier 382*a*, 382*b*. Each mixing block 384*a*, 384*b* provides a mixed-output-signal 390*a*, 390*b* by adding the respective multiplied-input-signalling 386*a*, 386*b* to the respective multiplied-output-signalling 388*a*, 388*b*. Each mixing block 384*a*, 384*b* can therefore provide the mixed-output-signal 390*a*, 390*b* based on a linear combination of respective multiplied-input-signalling 386*a*, 386*b* and with respective multiplied-output-signalling 388*a*, 388*b*.

The additional spectral processing block 372 can perform improved spectral noise suppression by processing the original input signal X(k,n) 362, or the output signal E(k,n) 369*a*, 369*b* of each signal processor 360*a*, 360*b*, or processing a combination of both, i.e., αX (k,n)+(1−α)E(k,n),α ∈ [0,1]. In such cases, the multiplication by factors of α and 1−α can be provided by a suitably configured mixing block.

Figure 4:
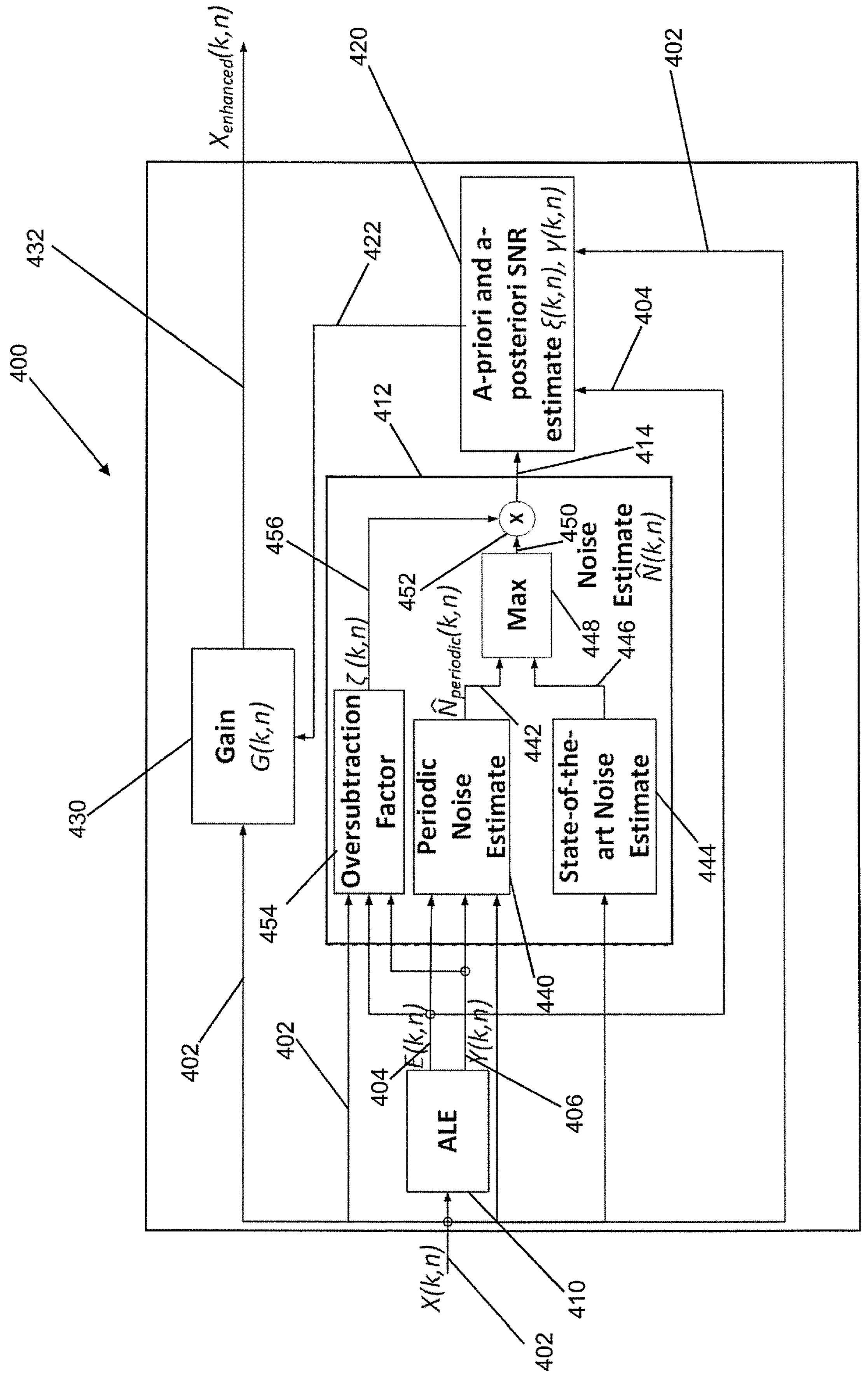
FIG. 4 shows an example embodiment of a system designed to apply an adaptive gain function to an input signal to provide an enhanced output signal.

FIG. 4 shows a system 400 configured to perform a spectral noise suppression method that includes applying a real-valued spectral gain function G(k,n) to an input-signal 402 X(k,n). The computation of the gain function can be based on an estimate $\hat{N}$(k,n) 450 of background noise and optionally an estimate of one or both of an a-posteriori and an a-priori signal-to-noise ratio (SNR), which may be denoted γ(k,n) and ε(k,n), respectively.

FIG. 4 shows a signal processor 410, similar to the signal processor described above in relation to FIG. 1*a*, FIG. 1*b* and FIG. 2, that is configured to process an input-signal 402, which in this example is a frequency domain signal, which can relate to the full frequency range of an original time domain audio input signal.

The signal processor 410 is configured to provide an output signal E(k,n) 404 and a noise-estimate-signal Y(k,n) 406 to a noise-estimation-block 412. The noise-estimation-block 412 is also configured to receive the input-signal X(k,n) 402, and to provide a background-noise-estimate-signal $\hat{N}$(k,n) 450 based on the input-signal X(k,n) 402, the output signal E(k,n) 404 and optionally the noise-estimate-signal Y(k,n) 406.

The system has a SNR estimation block 420 configured to receive the input-signal X(k,n) 402, the output signal E(k,n)

404 and an adapted-background-noise-estimate signal 414. As will be discussed below, the adapted-background-noise-estimate signal 414 in this example is the product of: (i) the background-noise-estimate-signal $\hat{N}$(k,n) 450; and (ii) an oversubtraction-factor signal ζ(k,n) 456. The SNR estimation block 420 can then provide SNR-signalling 422, based on the input-signal X(k,n) 402, the output signal E(k,n) 404 and the adapted-background-noise-estimate signal 414. The SNR-signalling 422 in this example is representative of both an a priori SNR estimate and an a posteriori SNR estimate. In other examples, a system of the present disclosure can provide SNR-signalling that is representative of only an a priori SNR estimate or only an a posteriori SNR estimate.

The system has a gain block 430 configured to receive the input-signal X(k,n) 402 and the SNR-signalling 422, which in this example includes receiving an a-priori signal to noise estimation signal and an a-posteriori signal to noise estimation signal. The gain block 430 is configured to provide an enhanced output signal $X_{enhanced}$(k,n) 432 based on the input-signal X(k,n) 402 and the SNR-signalling 422.

The a-priori signal-to-noise ratio ε(k,n), and the a-posteriori signal to noise ratio γ(k,n) can be estimated using a decision-directed approach, as exemplified by the following equations:

$$\varepsilon(k,n)=\beta\left|\frac{G(k,n-1)X(k,n-1)}{\hat{N}(k,n-1)}\right|^2+(1-\beta)\max(\gamma(k,n)-1,0)$$

$$\gamma(k,n)=\left|\frac{X(k,n)}{\hat{N}(k,n)}\right|^2$$

The input-signal 402 X(k,n), the noise-estimate-signal 406 Y(k,n), and the output signal 404 E(k,n) can be used to generate a background-noise-estimate signal 442 $\hat{N}_{periodic}$(k,n), which is representative of the periodic background noise components. These signals can also be used to improve the a-priori SNR computation performed by the SNR-block 420.

In the system 400 shown in FIG. 4 the gain block 430 applies a gain function to the input-signal 402 X(k,n) to provide the enhanced output signal $X_{enhanced}$(k,n) 432. However, in other examples, instead of applying the gain function to the input-signal 402 X(k,n) the gain block 430 can apply the gain function to the output signal 404 E(k,n) or to a combination of both the input-signal 402 X(k,n) and the output signal 404 E(k,n) as described above in relation to FIG. 3.

In this example, the noise-estimation-block 412 comprises several sub-blocks described below.

A first sub-block is a periodic-noise-estimate block 440, which is configured to receive the input-signal X(k,n) 402, the output signal E(k,n) 404 and the noise-estimate-signal Y(k,n) 406, and to provide the periodic-noise-estimate signal 442 $\hat{N}_{periodic}$(k,n) based on the above received signals.

A second sub-block is a state-of-the-art-noise-estimate block 444, which is configured to receive the input-signal X(k,n) 402 and to provide a state-of-the-art-noise-estimate signal 446. In this example, the state-of-the-art-noise-estimate signal 446 is determined based on a power or magnitude spectrum of the input-signal X(k,n) 402, which can be provided by means of minimum tracking. The state-of-the-art-noise-estimate signal 446 is representative of only the long-term stationary noise components present in the input-signal X(k,n) 402.

The magnitude spectrum of the periodic-noise-estimate signal 442 $\hat{N}_{periodic}$(k,n), which may be denoted $|\hat{N}_{periodic}$(k,n)|, can be estimated based on the magnitude spectrum of Y(k,n) or through spectral subtraction of X(k,n) from E(k,n) according to the following equation:

$$|\hat{N}_{periodic}(k,n)|=\min(1,\max(1-|E(k,n)|/|X(k,n)|,0))|X(k,n)|.$$

Both the state-of-the-art-noise-estimate signal 446 and the periodic-noise-estimate signal $\hat{N}_{periodic}$(k,n) 442 are provided to a max-block 448. The max-block 448 is configured to combine the periodic-noise-estimate signal $\hat{N}_{periodic}$(k,n) 442 with the state-of-the-art-noise-estimate signal 446 by taking the signal that is the larger of the two, to provide the background-noise-estimate-signal $\hat{N}$(k,n) 450, representative of the larger signal, to a combiner block 452.

The noise-estimation-block 412 also has an oversubtraction-factor-block 454 configured to receive the input-signal X(k,n) 402, the output signal E(k,n) 404 and the noise-estimate-signal Y(k,n) 406, and to provide an oversubtraction-factor signal ζ(k,n) 456 based on the above received signals.

In this example, the combiner block 452 multiples the background-noise-estimate-signal $\hat{N}$(k,n) 450 by the oversubtraction-factor signal 456 ζ(k,n) to provide the adapted-background-noise-estimate signal 414. The oversubtraction-factor signal 456 ζ(k,n) is determined such that it provides a higher oversubtraction-factor signal 456 (k,n) and hence increased noise suppression, when periodic noise is detected. For example, the oversubtraction-factor-signal 456 ζ(k, n) can be determined according to the following expression:

$$\zeta(k,n)\sim\min(1,\max(1-|E(k,n)|/|X(k,n)|,0))$$

In some examples, the output signal 404 E(k,n) can be used by the SNR estimation block 420 in the computation of the a-priori signal-to-noise ratio instead of the input-signal 402 X(k,n) which can provide for improved discrimination between speech and periodic noise.

In some systems that do not use pitch-driven adaptive line enhancers, adaptive line enhancers can be used to generate a background noise estimate but not to do any actual noise suppression. One such method makes use of a cascade of two time-domain line enhancers. The adaptive line enhancers focus on the removal of periodic noise or harmonic speech, respectively, by setting an appropriate delay: by using a large delay, mainly periodic noise is cancelled, whereas by using a shorter delay, the main focus is on removal of the speech harmonics. If no pitch information is used in setting the step-size control of the time-domain line enhancer then performance may be reduced compared to signal processors of the present disclosure. For example, more persistent speech harmonics may be attenuated when using a large delay, whereas some periodic noise components may also be attenuated when using a short delay. In such cases there can still be a compromise between preservation of speech harmonics versus periodic noise estimation and suppression.

In signal processors of the present disclosure, it is possible to re-compute the step size during each short-term input-signal (which may be around 10 ms in duration) based on speech information, i.e., the pitch estimate. Frequency bins corresponding to the estimated pitch can be adapted more slowly compared to the other frequency bins. As a result, speech components of the signal can be protected, including in the presence of long-term periodic noise. In addition, since adaptation is only reduced on the frequency bins corresponding to the pitch harmonics, short term periodic noises can still be effectively suppressed. In other examples, it is possible to control the step size based on the periodicity of noise and not based on the presence of voiced speech. Such a method may only update a frequency domain signal processor when structured, periodic noise is present. The periodicity can be estimated based on relatively long time segments and the step size can be re-computed for every successive block of, for example, 3 seconds duration.

In signal processors of the present disclosure, complex-valued processing can be used and phase information can therefore be exploited. Instead of delaying the input to the ALE, the desired signal is delayed. The pitch can be used to adaptively set the delay of the line enhancer. This can keep the weights high during voiced speech and not to prevent the ALE from adapting voiced speech. In other examples, noise suppression may mainly target stochastic noise suppression and not periodic noise suppression. Such line enhancers may operate on spectral magnitudes. However, only a real-valued gain function is typically used in such methods and hence, no phase information is exploited.

Signal processors of the present disclosure can include an adaptive line enhancer that adapts on periodic noise components and does not adapt on the speech harmonics. Thereby, the output of the signal processor can consist of a microphone signal in which periodic noise components are removed, or at least suppressed. In other examples the aim of an adaptive line enhancer may be to adapt on pitch harmonics by using a delay equal to the pitch period. The output of such an adaptive line enhancer can consist of a microphone signal in which the pitch harmonics are suppressed.

In signal processors of the present disclosure, it can be possible to control the adaptation of a line enhancer in accordance with the pitch, such that it can be possible to avoid/reduce adaptation of speech harmonics and thereby provide an improved speech signal. In other examples, the adaptation of a line enhancer is not controlled by the pitch: only the delay may be set based on the pitch frequency.

Signal processors of the present disclosure can include a line enhancer that provides signals that can be used to generate an estimate of the periodic noise components (not necessarily the complete background noise). The periodic noise estimate can be used for noise suppression (i.e. irrespectively of voicing). In addition, the output of the line enhancer can be used as an improved speech estimate in the computation of the a-priori signal-to-noise ratio, as discussed above in relation to FIG. 4. In other examples, the output of a line enhancer (in which the pitch harmonics are removed) can be used during voiced speech segments to estimate the background noise in a spectral subtraction method.

Pitch-driven adaptation of an adaptive line enhancer, according to the present disclosure, provides advantages. The pitch-driven (frequency-selective) adaptation control of an adaptive line enhancer enables periodic noise components to be suppressed, while harmonic speech components are preserved. In addition, an ALE-based spectral noise reduction method that uses information from the adaptive line enhancer in the design of its spectral gain function can also provide superior performance. The ALE-based spectral noise reduction method provides improved suppression of periodic noise components compared to other methods.

Signal processors of the present disclosure can be used in any single- or multi-channel speech enhancement method for suppressing structured, periodic noise components. Possible applications include speech enhancement for voice-calling, speech enhancement front-end for automatic speech recognition, and hearing aid signal processing, for example.

Signal processors of the present disclosure can provide for improved speech quality and intelligibility in voice calling in noisy and reverberant environments, including for both mobile and smart home Speech User Interface applications. Such signal processors can be provided for improved human-to-machine interaction for mobile and smart home applications (e.g., smart TV) through noise reduction, echo cancellation and dereverberation.

An important feature of signal processors of the present disclosure is the pitch-driven adaptation of an adaptive line enhancer. The pitch-driven adaptation control can enable periodic noise components to be suppressed, while harmonic speech components can be preserved. In the case of a time-domain line enhancer, adaptation can be controlled based on the strength, or amplitude, of the estimated pitch or voicing. The counterpart frequency-domain method exploits an estimate of the pitch frequency and its harmonics to slow down or stop adaptation of the line enhancer on speech harmonics, while maintaining adaptation on noisy frequency bins that do not contain speech harmonics. The pitch can be estimated using state-of-the-art techniques (e.g., in the time-domain, cepstral domain or spectral domain) known to persons skilled in the art. The accuracy of the pitch estimate is not crucial for the method to work. During voiced speech, pitch estimates of consecutive frames will often overlap, whereas during noise, the estimated pitch frequency will vary more across time. Hence, adaptation will be naturally avoided on speech harmonics. As a result, voiced/unvoiced classification is not critical for the method to work. Such techniques could, however, be used to further refine the adaptation.

The output of the pitch-driven adaptive line enhancer can be used as an improved input to any state-of-the-art noise reduction method. Furthermore, this disclosure shows how the adaptive line enhancer signals can be used to steer a modified noise reduction system with improved suppression of periodic noise components.

An adaptive line enhancer (ALE) can suppress deterministic periodic noise components by exploiting the correlation between the current microphone input and its delayed version. Since the ALE exploits both magnitude and phase information, a higher suppression of the deterministic, periodic noise components can be achieved compared to systems limited to real-valued gain processing. However, voiced speech components are also periodic by nature. Additional control mechanisms can thus be used to preserve the target speech, while attenuating periodic noise.

Signal processors of the present disclosure provide both structured, periodic noise suppression and target speech preservation without compromise by using a pitch-driven adaptation control. The pitch-driven adaptation slows down the adaptation of the line enhancer on speech harmonics. In principle, the concept can be used in combination with both time-domain as well as sub-band and frequency-domain line enhancers.

Compared to a time-domain line enhancer, a frequency-domain implementation allows for a frequency-selective adaptation and hence, a better compromise between preservation of speech harmonics and suppression of periodic noise components.

A frequency-selective adaptation by an estimate of the pitch frequency and its harmonics, can slow down adaptation on frequencies corresponding to the speech harmonics while maintaining fast adaptation on noise components in-between speech harmonics.

The frequency-selective adaptation control can be refined by exploiting a voiced/unvoiced detection in combination with pitch. However, voiced/unvoiced detection is not essential for the method to work. During voiced speech, consecutive pitch estimates are expected to vary slowly across time, whereas during noise, the pitch estimate will vary more quickly. As a result, adaptation will mainly be slowed down on voiced speech components and not on the noise, even when some erroneous pitch detections are made. A state-of-the art pitch estimator is therefore sufficiently accurate for the method to work.

The output of the line enhancer can be used as an improved input to another state-of-the-art noise reduction system. Furthermore, the signals of the line enhancer can be used in the design of a modified noise reduction system, resulting in a better suppression of periodic noise components compared to other systems.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments, the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. A system comprising:

a pitch detection block configured to generate a voicing-signal representative of a voiced speech component of an input-signal; and a signal processor including;

an input terminal, configured to receive the input-signal;

a voicing-terminal, configured to receive the voicing-signal from the pitch detection block;

an output terminal;

a delay block, configured to receive the input-signal and provide a filter-input-signal as a delayed representation of the input-signal;

a filter block, configured to:

receive the filter-input-signal; and provide a noise-estimate-signal by filtering the filter-input-signal;

a combiner block, configured to:

receive a combiner-input-signal representative of the input-signal;

receive the noise-estimate-signal; and combine the combiner-input-signal with the noise-estimate-signal to provide an output-signal to the output terminal; and a filter-control-block, configured to:

receive the voicing-signal from the voicing-terminal;

receive signalling representative of the input-signal; and set filter coefficients of the filter block in accordance with the voicing-signal and the input-signal such that frequency bins corresponding to speech are adapted more slowly than frequency bins corresponding to noise;

wherein the signal processor includes an additional-output-terminal;

wherein the signal processor is further configured to provide an additional-output-signal to the additional-output-terminal; and wherein the additional-output-signal provided to the additional-output-terminal includes the filter-coefficients.

2. The system of claim 1, wherein the filter-control-block is configured to set the filter coefficients based on previous filter coefficients, a step-size parameter, the input-signal, and one or both of the output-signal and the delayed-earlier-input-signal.

3. The system of claim 2, wherein the filter-control-block is configured to set the step-size parameter in accordance with one or more of:

a fundamental frequency of the pitch of the voice-component of the input-signal;

a harmonic frequency of the voice-component of the input-signal;

an input-power representative of a power of the input-signal;

an output-power representative of a power of the output signal; and a probability of the input-signal comprising a voiced speech component and/or the strength of the voiced speech component.

4. The system of claim 3, wherein the filter-control-block is configured to determine the probability based on:

a distance between a pitch harmonic of the input-signal and a frequency of the input-signal; or a height of a Cepstral peak of the input-signal.

5. The system of claim 1, wherein the filter-control-block is configured to:

determine a leakage factor in accordance with the voicing-signal; and set the filter coefficients by multiplying filter coefficients by the leakage factor.

6. The system of claim 5, wherein the filter-control-block is configured to set the leakage factor in accordance with a decreasing function of a probability of the input-signal comprising a voice signal.

7. The system of claim 1, wherein the filter-control-block is configured to:

receive signalling representative of the output-signal and/or a delayed-input-signal; and set the filter coefficients of the filter block in accordance with the output-signal and/or the delayed-input-signal.

8. The system of claim 1, wherein the input-signal and the output-signal are frequency domain signals relating to a discrete frequency bin, and wherein the filter coefficients have complex values.

9. The system of claim 1, wherein the voicing-signal generated by the pitch detection block is representative of one or more of:

a fundamental frequency of the pitch of the voice-component of the input-signal;

a harmonic frequency of the voice-component of the input-signal; and a probability of the input-signal comprising a voiced speech component and/or the strength of the voiced speech component.

10. The system of claim 1, wherein the signal processor further comprises a mixing block configured to provide a mixed-output-signal based on a linear combination of the input-signal and the output signal.

11. The system of claim 1, further comprising:

a noise-estimation-block, configured to provide a background-noise-estimate-signal based on the input-signal and the output signal;

an a-priori signal to noise estimation block and/or an a-posteriori signal to noise estimation block, configured to provide an a-priori signal to noise estimation signal and/or an a-posteriori signal to noise estimation signal based on the input-signal, the output signal and the background-noise-estimate-signal; and a gain block, configured to provide an enhanced output signal based on: (i) the input-signal; and (ii) the a-priori signal to noise estimation signal and/or the a-posteriori signal to noise estimation signal.

12. The system of claim 1, wherein the input-signal is a time-domain-signal and the voicing-signal is representative of one or more of:

a probability of the input-signal comprising a voiced speech component; and the strength of the voiced speech component in the input-signal.

13. The system of claim 1 comprising a plurality of signal processors, wherein each signal processor is configured to receive an input-signal that is a frequency-domain-bin-signal, and each frequency-domain-bin-signal relates to a different frequency bin.

14. The system of claim 1, wherein the pitch detection block receives time-to-frequency signalling representative of the input-signal and spectral signalling that is representative of the output signal.

15. A computer readable medium containing computer readable instructions, which when run on a computer, causes the computer to configure the signal processor of claim 1.

16. A method for automatic speech recognition, comprising:

generating a voicing-signal representative of a voiced speech component of an input-signal using a pitch detection block;

receiving the input-signal at a signal processor;

receiving the voicing-signal at a voicing-terminal from the pitch detection block;

receiving the input-signal at a delay block;

providing a filter-input-signal from the delay block as a delayed representation of the input-signal;

receiving the filter-input-signal at a filter block;

providing a noise-estimate-signal from the filter block by filtering the filter-input-signal;

receiving a combiner-input-signal representative of the input-signal at a combiner block;

receiving the noise-estimate-signal at the combiner block;

combining the combiner-input-signal with the noise-estimate-signal to provide an output-signal from the combiner block to an output terminal;

receiving the voicing-signal from the voicing-terminal at a filter-control-block;

receiving signalling representative of the input-signal at the filter-control-block;

setting filter coefficients of the filter block in accordance with the voicing-signal and the input-signal such that frequency bins corresponding to speech are adapted more slowly than frequency bins corresponding to noise;

providing an additional-output-signal from the signal processor to an additional-output-terminal; and wherein the additional-output-signal includes the filter-coefficients.

17. A method for speech enhancement, comprising:

generating a voicing-signal representative of a voiced speech component of an input-signal;

providing a filter-input-signal as a delayed representation of the input-signal;

providing a noise-estimate-signal by filtering the filter-input-signal;

receiving a combiner-input-signal representative of the input-signal;

combining the combiner-input-signal with the noise-estimate-signal to provide a first output-signal;

setting filter coefficients in accordance with the voicing-signal and the input-signal such that frequency bins corresponding to speech are adapted more slowly than frequency bins corresponding to noise;

providing a second output-signal; and wherein the second output-signal includes the filter-coefficients.

* * * * *